(12) United States Patent
Meya et al.

(10) Patent No.: US 8,631,930 B2
(45) Date of Patent: Jan. 21, 2014

(54) LINK CHAIN FOR CHAIN CONVEYORS AND HORIZONTAL CHAIN LINKS THEREFOR

(75) Inventors: Hans Meya, Werne (DE); Karl-Heinz Schurer, Herne (DE); Thomas Tegethoff, Dortmund (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 286 days.

(21) Appl. No.: 13/143,285

(22) PCT Filed: Jan. 4, 2010

(86) PCT No.: PCT/IB2010/050008
§ 371 (c)(1),
(2), (4) Date: Jul. 5, 2011

(87) PCT Pub. No.: WO2010/079437
PCT Pub. Date: Jul. 15, 2010

(65) Prior Publication Data
US 2011/0272253 A1    Nov. 10, 2011

(30) Foreign Application Priority Data
Jan. 7, 2009  (DE) .................... 20 2009 000 265 U

(51) Int. Cl.
*B65G 17/06* (2006.01)

(52) U.S. Cl.
USPC ..................................... 198/850

(58) Field of Classification Search
USPC ......... 198/717, 725, 728, 730, 731, 733, 850; 59/84
See application file for complete search history.

(56) References Cited

U.S. PATENT DOCUMENTS

| | | | | |
|---|---|---|---|---|
| 352,742 A * | 11/1886 | Dodge, James | ............... | 198/850 |
| 3,744,239 A * | 7/1973 | I'Anson | ............................ | 59/84 |
| 6,062,374 A * | 5/2000 | Meya | ............................ | 198/731 |
| 7,246,699 B2 * | 7/2007 | Frost et al. | ..................... | 198/851 |
| 7,775,342 B2 | 8/2010 | Merten et al. | | |
| 7,997,402 B2 * | 8/2011 | Merten et al. | ................. | 198/728 |
| 2006/0014600 A1 | 1/2006 | Wu | | |
| 2009/0266681 A1 * | 10/2009 | Merten et al. | ................. | 198/731 |
| 2009/0272632 A1 * | 11/2009 | Merten et al. | ................. | 198/835 |
| 2010/0307127 A1 * | 12/2010 | Pengg et al. | ...................... | 59/84 |

FOREIGN PATENT DOCUMENTS

| | | |
|---|---|---|
| BE | 1012468 A3 | 11/2000 |
| DE | 2247300 | 3/1974 |
| DE | 3907621 A1 | 9/1990 |
| DE | 4426506 A1 | 2/1996 |
| DE | 19701579 A1 | 6/1998 |
| DE | 202008010054 U1 | 9/2009 |
| EP | 1388504 A1 | 2/2004 |
| EP | 2039959 A1 | 3/2009 |
| WO | 2007/110089 A1 | 10/2007 |
| WO | 2007110088 A1 | 10/2007 |

* cited by examiner

*Primary Examiner* — Leslie A Nicholson, III
(74) *Attorney, Agent, or Firm* — Foley & Lardner LLP

(57) ABSTRACT

A link chain for chain conveyors for use in mining, with vertical chain links having a constant cross-sectional profile provided on the inside with a circular arc and on the outside preferably with a flat section, and with horizontal chain links having front sections, longitudinal limbs and an oval inner opening. The longitudinal limbs on the outer sides comprising at least adjacent to the upper and lower sides a spherical shaped surface and/or the horizontal chain links comprising on the transition of the front sections into the longitudinal limbs corner areas, wherein the longitudinal limbs on their top side and bottom side at least in the corner areas are partially provided with a cavity.

29 Claims, 5 Drawing Sheets

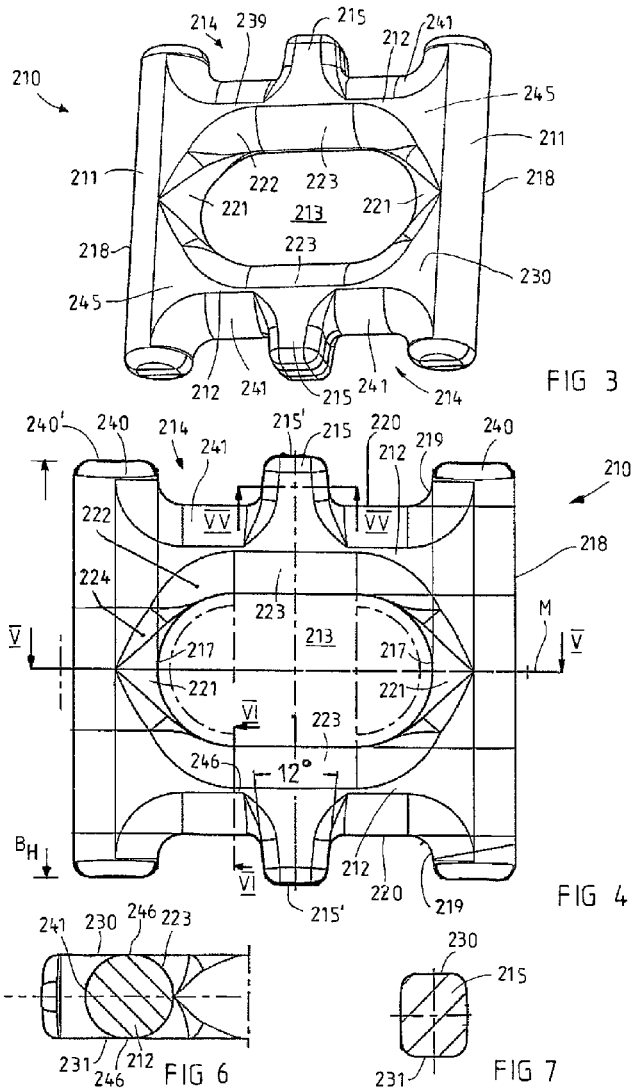

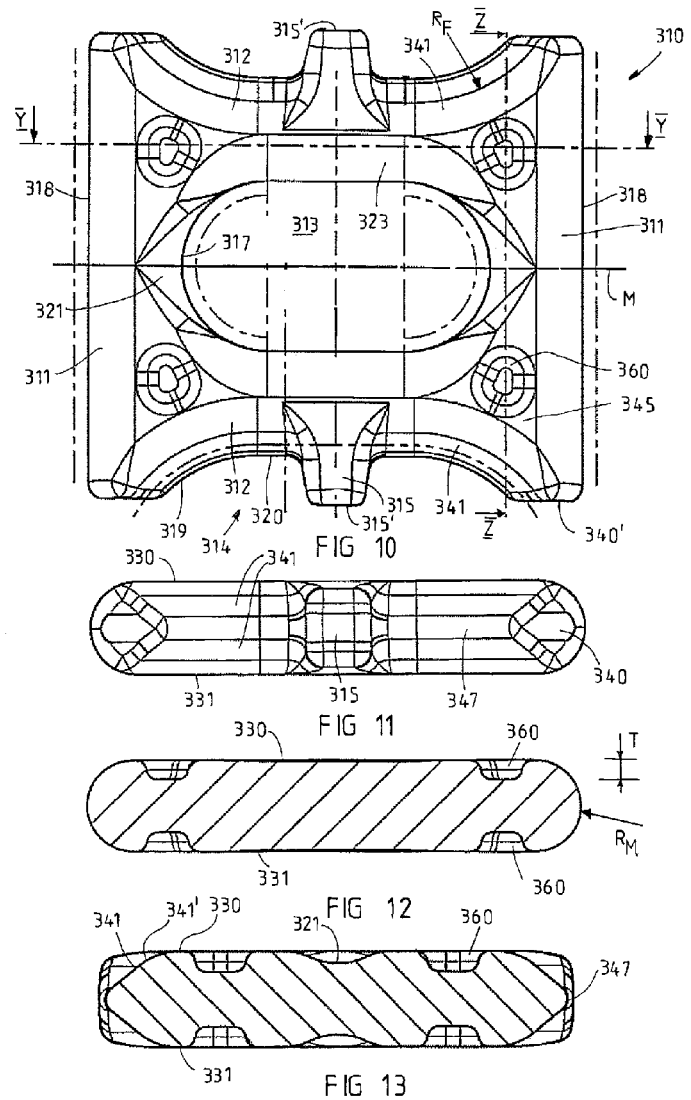

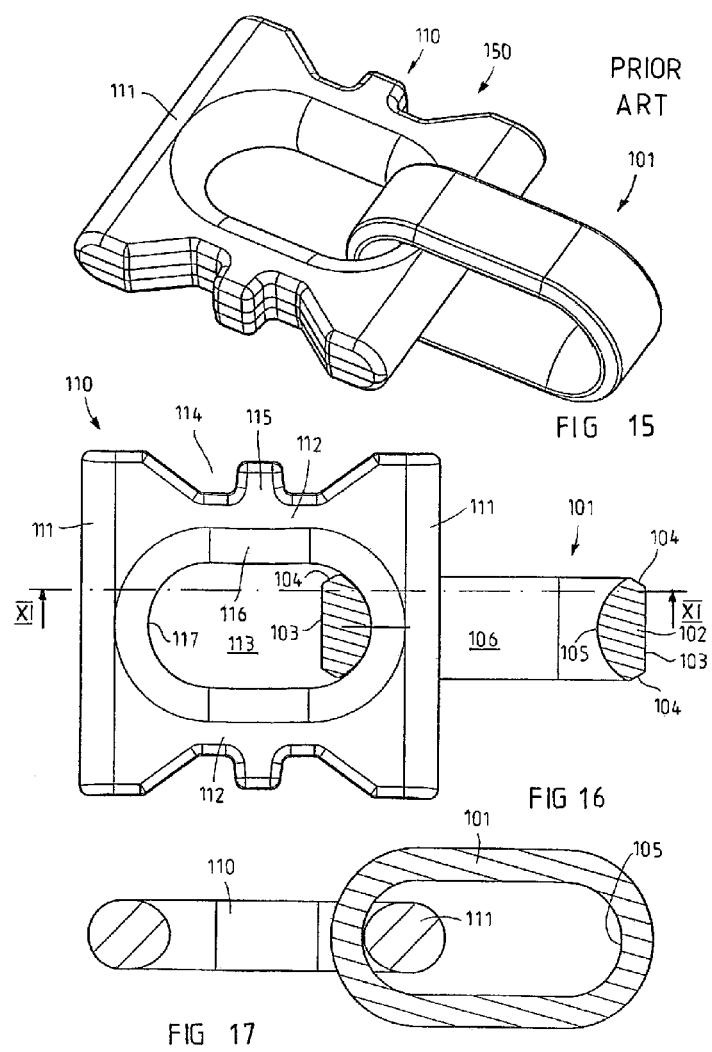

LINK CHAIN FOR CHAIN CONVEYORS AND HORIZONTAL CHAIN LINKS THEREFOR

The invention relates to a link chain for chain conveyors, in particular scraper chain conveyors for use in mining, with vertical chain links which have around the full circumference a constant cross-sectional profile provided on the inside with a circular arc and on the outside preferably with a flat section, and with horizontal chain links which have front sections with a straight face zone and preferably have an outer width which is larger than the outer width of the vertical chain links and have the longitudinal limbs, which connect the front sections around an oval inner opening and which are provided on their outer surfaces with a recess, wherein the rear sides of the front sections delimiting the inner opening form a contact zone for the circular arcs of the vertical chain links and connect the longitudinal limbs with a semi-circular portion. The invention also relates in particular to the horizontal chain links, which preferably act to connect entrainment scrapers, of a link chain for scraper chain conveyors for use in mining, with front sections with a straight face zone and with longitudinal limbs connecting the front sections around an oval inner opening, which longitudinal limbs are provided on their outer surfaces with a recess, wherein the rear sides, which delimit the inner opening, of the front sections form a contact zone for circular arcs of vertical chain links and connect the longitudinal limbs with a semi-circular portion.

BACKGROUND OF THE INVENTION

A generic link chain is known from WO 2007/11088 A1 and FIGS. 15, 16 and 17 show a generic link chain 150, a vertical chain link 101 and a horizontal chain link 110 for connection of an entrainment scraper according to generic WO2007/110088 A1. Vertical chain link 101 has around the full circumference a constant cross-section 102, as shown in FIG. 16, which is delimited on the circumferential outside of chain links 101 by a flat section 103 which forms a transition on both sides via bevels 104 into a circular arc 105 which delimits an inner opening 106, which is oval in cross-section, of vertical chain links 101. Horizontal chain links 110, which comprise forged pieces, have front sections 111 and longitudinal limbs 112 connecting these which in turn delimit with their rear sides or inner sides an oval inner opening 113 in which vertical chain links 101 are interlinked. For optimized scraper connection, longitudinal limbs 112 are provided on the outside with recesses 114 in which entrainment noses 115 are centrally arranged, on which entrainment noses 115 scraper chains can be anchored in a positive-locking manner for conveyance of the mined minerals or rock. Inner opening 113 is delimited by a circumferential fillet 116 with a uniform degree of rounding, which fillet 116 extends on the rear sides of front sections 111 across in each case a semi-circular portion 117. Circular arcs 105 of vertical chain links 101 adjoin this semi-circular portion. FIG. 17 shows in detail the contact of circular arcs 105 and rear sides 107 of front sections 111 in an eccentric section at the edge of vertical chain links 101 and horizontal chain links 110. In the case of the generic link chain, due to the large width of front sections 111 of the horizontal chain links, the linear course of the front side of front sections 111 and the configuration of vertical chain links 101 having a significantly smaller outer width with the approximately semi-circular cross-section, advantageous rotational characteristics of link chain 150 at the driven chain wheel are achieved. As a result of the straight face zones of the front sections, the surface pressures between these and the pockets of the chain wheel are significantly reduced in comparison to otherwise conventional horizontal chain links with arcuate front sections or front faces. Since the front sections of the horizontal chain links protrude relatively far forward and laterally into the respective pockets of the chain links, even after more significant signs of wear on the pockets of the chain wheel, only slightly increased surface pressures over the initial status are generated. Vertical chain links 101 with a semi-circular profile are, at the same time, of a small structure and satisfy the required high cross-sectional strengths in order to be able to withstand even extreme chain forces which occur in operational use of the link chain in high-performance conveyors. Scrapers can be connected and entrained in a positive-locking manner via entrainment means 115 without the need to provide additional reinforcement. Bevel 104 on vertical chain links 101 is intended to additionally improve the angling capacity of the horizontal and vertical chain links relative to one another and the running characteristics of the link chain particularly during feeding into a chain wheel. In the case of generic horizontal chain links 110, the inner surfaces, which face oval inner opening 113, of front sections 111 and of longitudinal limbs 112 have a surface which comprises a circumferential fillet with a uniform radius of curvature, as a result of which the oval inner opening in each case forms a transition via a surface, which is cambered in a crowned manner, to the upper and lower sides of the front sections or longitudinal limbs.

SUMMARY OF THE INVENTION

It is an object of the invention to create a high-strength link chain for use in particular in the case of scraper chain conveyors which can even be easily used in the case of large lengths of several hundred meters without being dimensioned over proportionally in terms of their height and in terms of their weight and which is also characterized by good load and running characteristics of the horizontal and vertical chain links between one another and enables a long service life.

This object and others is achieved with a link chain for chain conveyors, in particular scraper chain conveyors for use in mining, with vertical chain links which have around the full circumference a generally constant cross-sectional profile provided on the inside with a circular arc and on the outside preferably with a flat section, and with horizontal chain links which have front sections with a generally straight face zone and longitudinal limbs, which connect the front sections around an oval inner opening and which are provided on their outer surfaces with a recess, wherein the rear sides of the front sections delimiting the inner opening form a contact zone for the circular arcs of the vertical chain links, the horizontal links further comprises at least one of the longitudinal limbs on the outer sides, which face the recess, having at least adjacent to the upper side and lower side of the horizontal chain links a spherical shaped surface and on the transition of the front sections into the longitudinal limbs corner areas, wherein the longitudinal limbs on their top side and bottom side at least in the corner areas are partially provided with a cavity and with regard to a chain link, preferably for connection of entrainment scrapers to link chains for scraper chain conveyors for use in mining, with front sections with a straight face zone and with longitudinal limbs, which connect the front sections around an oval inner opening and which are provided on their outer surfaces with a recess, wherein the rear sides of the front sections delimiting the inner opening form a contact zone for circular arcs of vertical chain links and connect the longitudinal limbs to a semi-circular portion, the chain link further comprises at least one of the longitudinal limbs on the outer sides, which face the recess, having at least adjacent to the upper side and lower side of the horizontal chain links a spherical shaped surface and on the transition to the font sections into the longitudinal limbs corner areas, wherein the longitudinal limbs on their top side and bottom side at least in the corner areas are partially provided with a cavity.

According to certain aspects of the invention, the longitudinal limbs of the horizontal chain links are provided on the outer surfaces, which face the recess, at least adjoining the upper side and lower side of the horizontal chain links with a surface, which is cambered in a crowned manner, and/or that the horizontal chain links have corner regions at the transition of the front sections to the longitudinal limbs, the longitudinal limbs being provided partially with cavities in the corner regions on their upper side and lower side. Both measures can be provided jointly or independently of one another on a horizontal chain link. As a result of both measures, not only can the bearing surface of the lower sides on the conveyor strand base or return strand base of a scraper chain conveyor be significantly reduced but also the overall weight of each horizontal chain link can be reduced. As a result of the minimization of weight achieved in the case of the horizontal chain link, which can be up to approximately 7% in comparison to the generic chain link with the same chain geometry, a smaller driving power is required to move the link chain. The reduction in the bearing surface, which can even exceed 50% as a result of the measures according to the invention with an otherwise identical chain link geometry, has a particularly positive effect on the operating performance of the link chain since a higher surface pressure occurs as a result of the smaller bearing surface even taking into account the lower weight, as a result of which the displacement action for nutty slack and other materials located in the path of movement is increased and the feed-in performance of the chain links in chain pockets is simultaneously improved at a chain wheel.

According to a particularly preferred embodiment, the horizontal chain links could be provided on the rear sides, which face the oval inner opening, of the front sections with a surface which has a hollow within a fillet cambered in a crowned manner, which hollow forms a central region of the contact zone. As a result of the fillet cambered in a crowned manner and the hollow, which is formed between two lateral, rounded sections and forms the central region, on the one hand, a substantially more advantageous bearing of the circular arcs of the vertical chain links on the relevant contact surfaces of the rear sides of the front sections is achieved and, at the same time, a greater material thickness can be provided in those regions which lie laterally of the central plane at an offset to the longitudinal limbs of the horizontal chain links. Due to unwinding in ongoing operational use, greater wear occurs on these regions which are proportionally reinforced by the configuration according to the particularly preferred inventive embodiment than in the central region. The shape of the surface therefore forms an optimized profiling of the rear sides of the front sections and insofar enables in terms of design a longer service life of the chain links and the entire link chain. In particular, the osculation between the circular arcs on the vertical chain links and the contact region on the rear sides of the front sections is significantly improved by the reconfiguration in terms of design with the hollows.

In the case of a link chain with the configuration according to the invention of the horizontal chain links, it is particularly advantageous if the cross-sectional profile of the vertical chain links is provided in each case at the transition of the flat section into the circular arc with a bevel, wherein the cross-sectional profile of the vertical chain links preferably has a width to thickness ratio $LV/DV \geq 2$.

In the case of the particularly preferred configuration of a link chain or of a horizontal chain link, the hollow extends with a constant radius of curvature across the surface of the rear sides of the front sections. The constant radius of curvature is therefore preferably adapted to the constant circular arc on the surfaces of the vertical chain links interacting with the contact zone, such that, irrespective of the pivot status of the vertical and horizontal chain links to one another, uniformly optimized surface pressures and contact forces are generated. The design of the surface of the front sections is preferably arrived at such that the radius of curvature of the hollow has a crown line which lies on a central longitudinal plane between the longitudinal limbs of the horizontal chain links. The central longitudinal plane also forms, as is known per se for horizontal chain links, a plane of symmetry in relation to which all horizontal chain links are formed symmetrically. More preferably, the front sections have in the central longitudinal plane a circular cross-section with a defined radius. This radius preferably corresponds to the minimum material thickness of the horizontal chain links which are preferably produced as forged parts. The radius or minimum radius of the horizontal chain links in the symmetrical center of the front sections is preferably of equal size or substantially of equal size to the radius of curvature of the crowned fillet on those surfaces which lie i.a. adjacent to the hollow. This configuration additionally ensures an improved osculation between the circular arcs on the vertical chain links and the rear sides of the horizontal chain links and minimizes the corner stresses which occur to some extent in the prior art.

The crown line of the hollow preferably forms a semicircle around the center point of the front sections in the central longitudinal plane. The hollow preferably has on the rear side of the front sections a geometric form which is achieved in that the radius of curvature is unwound rotationally symmetrically around the center point of the front sections. Since the horizontal chain lines are preferably produced as forged parts, only the die must in principle be formed correspondingly negatively for production of the horizontal chain links.

In order to prevent sharp-edged transitions between the hollow formed by means of the unwound radius of curvature and the adjacent crowned fillets, the fillet preferably in each case forms a transition via an intermediate circular portion into the hollow, wherein the radius of curvature of the intermediate circular portion is more preferably significantly smaller, in particular less than half as large as the radius of curvature of the crowned fillet. In the case of forged parts, a suitable radius of curvature of the intermediate circular portion can be approximately 6 mm.

In principle, the surface pressures between the hollow according to the invention and the circular arc at the vertical chain link can also be minimized if the chain links have slightly oval curved surfaces or circular arcs with changing radii. In the case of the particularly preferred configuration, the hollow has a constant radius of curvature and the circular arc of the vertical chain links also has a constant radius, wherein, more preferably, the radius of curvature of the circular arc of the vertical chain links is preferably 2 to 4 mm smaller than the radius of curvature of the hollow such that in particular the tolerance deviations which unavoidably occur during forging do not adversely affect the improved osculation of the sections of the chain links which are in contact with one another. In the case of horizontal and vertical chain links produced from turned parts, the radius of curvature of the hollow and the radius of the circular arc can also be identical or quasi-identical since, unlike forged parts, production is possible with significantly fewer tolerance deviations.

It is particularly advantageous if the longitudinal limbs are also provided on their inside facing the inner opening with a fillet which is cambered in a crowned manner, wherein the degree of fillet or the fillet radius at the rear side of the front sections and the degree of fillet on the insides of the longitudinal limbs are of equal size.

It is particularly advantageous if the hollow extends across the entire semi-circular portion into the longitudinal limbs, wherein, as a result of the configuration of the surface, the spread of the hollow reduces parallel to the longitudinal central plane in an approximately straight line towards the outside. A corresponding delimitation of the hollow is generated as a result of the unwinding of the body corresponding to the radius of curvature of the hollow around the center point as well as the additionally provided fillet.

A link chain according to the invention can comprise a plurality of vertical chain links which are formed so as to be identical to one another as well as two different types of horizontal chain links, namely, on the one hand, horizontal chain links which serve the purpose of scraper connection and, on the other hand, horizontal chain links which do not have to fulfill this function. Depending on the configuration of the link chain, all or individual horizontal chain links can therefore be provided on both sides with the recesses with entrainment means which are formed centrally between both front sections and in each case protrude in a projecting manner into the relevant recess. A configuration which is particularly preferred according to the invention of the horizontal chain links with corresponding entrainment means is described in detail further below. Each entrainment means can comprise an entrainment nose formed on the longitudinal limb with a preferably trapezoidal cross-section.

According to a particularly advantageous configuration, the outer surfaces, which face the recesses, of the longitudinal limbs between the front sections and the entrainment means are provided with flanks which run in an at least partially arcuately cambered manner. It is particularly advantageous if a base section which runs in a straight line is formed between the arcuate flanks, from which base section the entrainment means or the entrainment nose projects. The arcuate flank not only facilitates the preferred manufacture of the horizontal chain links as cast parts but rather it simultaneously brings about a further reduction in the bearing surface and in the weight without reducing the supporting minimum cross-sections of the longitudinal limbs. The minimum cross-section is on the contrary extended to a larger range. An optimized minimization of the bearing surface and of the weight can be achieved if the arcuate flank has a circular arc curvature, wherein the circular radius can be smaller than the radius in the central longitudinal plane. Alternatively, the arcuate flank can also have a circular arc curvature, the circular radius of which is larger than the radius in the central longitudinal plane. It is furthermore advantageous if the surface, which is cambered in a crowned manner, extends from the upper and lower side over the arcuate flank and the linear base section and/or over the entire outer surface of the longitudinal limb, with the exception of the region in which the entrainment means is located.

In order to improve the connection of entrainment elements (chain scrapers) to the cam-like entrainment means on the horizontal chain links even in the case of deeply cut recesses, it can be expedient if the abutting surfaces of the entrainment means or entrainment noses protrude across the abutting surfaces of the front ends of the front sections and the horizontal chain links in the region of the entrainment means have the largest chain link width. More preferably, the front sections can have corner regions on the outsides at the transition to the longitudinal limbs and/or end in front ends with a circular cross-section, wherein the radius of the circular cross-section can then preferably be of equal size or substantially equal size to the radius in the central longitudinal plane. In the case of this configuration, the weight and bearing zone of the chain links are preferably small. The crowned camber of the surface of the longitudinal limbs on the outside thereof can then be at least partially of equal size or approximately equal size to a fillet, which is cambered in a crowned manner, of the surface of the longitudinal limbs on the insides which face the inner opening.

In the case of the configuration of the horizontal chain links with cavities, it is particularly advantageous if an individual cavity which is closed at the edge and at the base is formed in each corner region on the lower side and on the upper side. The cavity which is closed at the edge and base edge can in particular be formed substantially ovally longitudinally extended or triangularly or trilaterally in order to provide the substantially flat region which is available in the corner region over as large a surface area as possible with the cavity and minimize the bearing zone. According to one advantageous configuration, a flat intermediate section which (co-)forms the bearing surface or bearing zone for the chain link can be formed between the cambered insides and the cambered outer surfaces of the longitudinal limbs, which intermediate section can preferably widen from a narrow web towards the surfaces of the front sections in an approximately V-shaped manner. The cavities can then be formed in particular in the region of the intermediate sections widening in a V-shape. In the case of all configurations with cavities, these can in each case have a maximum depth which is between approximately $1/6$ and $1/2$ of the radius in the central longitudinal plane.

According to yet another alternative configuration which can also have its own inventive significance in the case of an otherwise generic chain link irrespective of the cavities and/or outsides which are cambered in a crowned manner, the front sections on the front sides can be provided centrally with a front reinforcement which projects towards the front, wherein the front reinforcement preferably has a curved front surface and the maximum width of the front reinforcement is of equal size to or smaller than the width of the inner opening.

Further advantages and configurations of a link chain according to the invention will become apparent from the following description of preferred exemplary embodiments of chain links according to the invention, shown in the drawings. Further, these and other objects, aspects, features, developments and advantages of the invention of this application will become apparent to those skilled in the art upon a reading of the Detailed Description of Embodiments set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 3 shows, in a perspective view, a horizontal chain link according to the invention according to the first exemplary embodiment;

FIG. 4 shows a top view of the horizontal chain link from FIG. 3;

FIG. 6 shows a sectional view along VI-VI in FIG. 4;

FIG. 7 shows a sectional view along VV-VV in FIG. 4;

FIG. 10 shows a top view of a horizontal chain link according to a second exemplary embodiment;

FIG. 11 shows the horizontal chain link from FIG. 10 in a side view;

FIG. 12 shows a sectional view along Y-Y in FIG. 10;

FIG. 13 shows a sectional view along Z-Z in FIG. 10;

FIG. 15 shows a perspective view of the chain links of a link chain according to WO2007/110088 from the prior art;

FIG. 16 shows a top view of the chain links from the prior art; and

FIG. 17 shows a sectional view along XX-XX in FIG. 16.

DETAILED DESCRIPTION OF EMBODIMENTS

Figure 1:
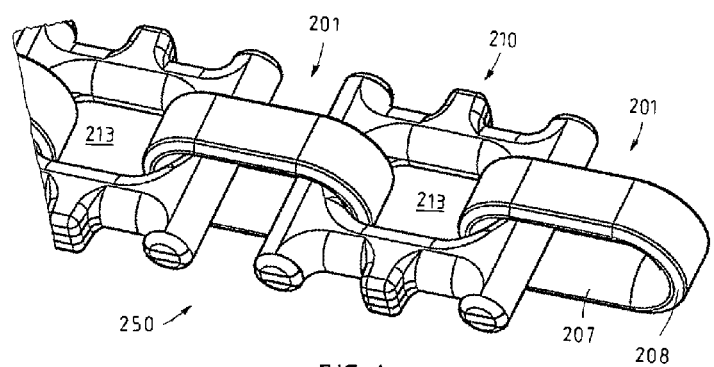
FIG. 1 shows, in a perspective view, a section of a link chain according to the invention according to a first exemplary embodiment.
Figure 2:
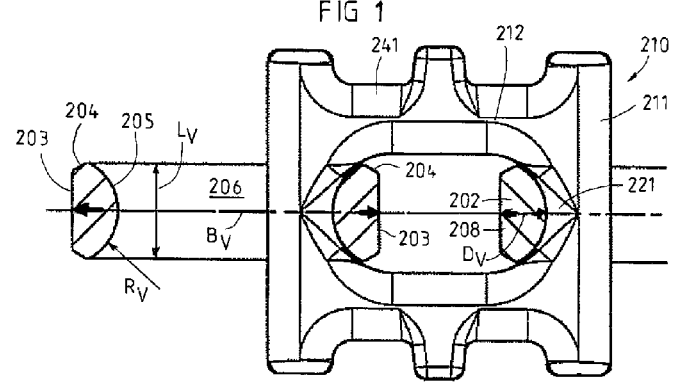
FIG. 2 shows a top view of the link chain from FIG. 1, partially opened out.

Referring now to the drawings wherein the showings are for the purpose of illustrating preferred and alternative embodiments of the invention only and not for the purpose of limiting same, FIGS. 1 and 2 show, from a link chain 250 according to a first inventive embodiment, two vertical chain links 201 which each are linked into the oval inner opening 213 of a horizontal chain link 210. Link chain 50 according to the invention can in particular be used in the case of scraper chain conveyors which are used as face conveyors in underground mining use, and in the case of which horizontal chain links 210 lie horizontally and rotate with link chain 250 in this horizontal alignment, while vertical chain links 201 rotate correspondingly perpendicular to this, therefore standing vertically. Vertical chain links 201 have longitudinal limbs 207 and chain fronts 208 which are provided around the full circumference with a constant cross-section 202, as is in particular apparent from FIG. 2. Circumferentially constant cross-section 202 is delimited on the outside of longitudinal limbs 207 and chain fronts 208 by a flat section 203 and, towards oval inner opening 206, longitudinal limbs 207 and chain fronts 208 each have a circular arc 205 which preferably across its entire extension has a constant radius $R_V$ which is approximately 35 mm in the case of the chain link thickness of a 42 mm×140 mm chain, and which is approximately 27.5 mm in the case of a chain link thickness of a 34 mm×110 mm chain. Circular arc 205 forms a transition into flat section 203 in each case via a bevel 204 running at an angle of approximately 60°±2° at an incline to flat section 203. Cross-sectional profile 202 of the vertical chain links has a width $L_V$, a height $B_V$ and a thickness $D_V$ which in the case of a 42 mm chain are approximately $L_V=62$ mm, $B_V=102$ mm and $D_V=30$ mm and which in the case of a 34 mm chain are approximately $L_V=49$ mm, $B_V=86$ mm and $D_V=24$ mm. Inner opening 206 then has a clear opening width of approximately 48 mm or 39 mm, respectively, and a clear opening or dividing length of approximately 140 mm or 110 mm, depending on the chain thickness.

As will be apparent from FIGS. 1 to 4, the horizontal chain links 210 consist of one-part or one-piece forged links with two front sections 211 with a straight face zone 218 aligned at a right angle to the running direction of link chain 250, wherein both front sections 211 are connected at the rear side via longitudinal limbs 212. Horizontal chain links 210 have two front sections 211 formed to be identical to one another as well as longitudinal limbs 212 formed to be identical to one another, only the cross-sectional profile changes approximately constantly within front sections 211 and longitudinal limbs 212. The horizontal chain links 210 have an overall approximately rectangular basic shape and face zone 218 running straight in the chain link central plane and perpendicular to the running direction extends approximately straight across entire outer width $B_H$ of horizontal chain links 210. Outer width $B_H$ is larger than outer width BV of vertical chain links 201. The ratio can be preferably approximately $B_H/B_V=210/102$ with a 42 mm chain and $B_H/B_V=166/86$ with a 34 mm chain, therefore approximately 2:1. Both longitudinal limbs 212 have on the outside a recess 214 in which, centrally between both front sections 211, an entrainment nose 215 is formed as a positive-locking entrainment means for entrainment scrapers, not shown, onto which the entrainment scrapers are placed e.g. from above and can then be locked. As is easily apparent from FIG. 4, entrainment nose 215 has in plan view an approximately trapezoidal cross-section and the entrainment nose widens to the outside of the longitudinal limbs with an angle of approximately 12°, and tapers to the outside, respectively. Each recess 214 has directly adjacent to the front sections 211 two circular shaped flanks 219, which form a transition into linear base sections 220, relative to which entrainment noses 215 project within recess 214. The length of recess 214 in chain running direction is here the same as the clear opening or dividing length (approx. 110 mm with a 34 mm chain) of inner opening 213 in the region of opposing semi-circular portions 217 in longitudinal central plane M which halves front sections 211. All transition surfaces are beveled with approximately 6° in order to produce chain links 210 according to the invention as forged pieces.

Figure 8:
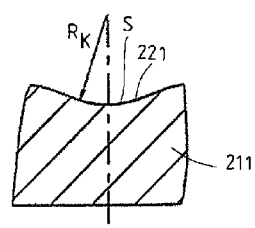
FIG. 8 shows a sectional view along W-W in FIG. 5.
Figure 9:
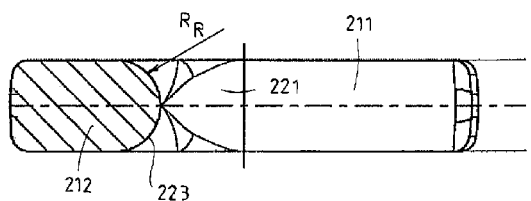
FIG. 9 shows the chain link from FIG. 4 in a view of a front section, partially in section through the entrainment nose.

Horizontal chain links 210 of link chain 250 are optimized for interaction with vertical chain links 201 in particular on the rear sides of front sections 211 facing inner opening 213 and this optimization will now at first be explained with further reference to the FIGS. 8 and 9. The linking optimization relates in particular to the configuration of the surfaces of the rear side of front sections 211 and the insides of longitudinal limbs 212 towards inner opening 213 delimited by these. As is already clearly apparent from FIGS. 3 and 4, the rear sides of front sections 211 are provided, directly adjacent to semi-circular portion 217 with which front sections 211 delimit oval inner opening 213 centrally of the chain links or in the horizontal central plane, with a hollow 221 which extends here tapering in a pointed manner or in a V-shape up to upper side 230 and lower side (231, FIG. 5) of horizontal chain links 210. Hollow 221 has the largest spread in the region of the horizontal central plane of the chain links and the spread correspondingly reduces towards upper side 230 and towards lower side. Hollow 221 therefore extends in a uniform manner from semi-circular portion 217 to upper side 230 or from semi-circular portion 217 to lower side of the horizontal chain links and forms the central region of the contact zone which the circular arcs (205) of vertical chain links 201 linked into horizontal chain links 210 adjoin, as is shown in FIG. 2.

Figure 5:
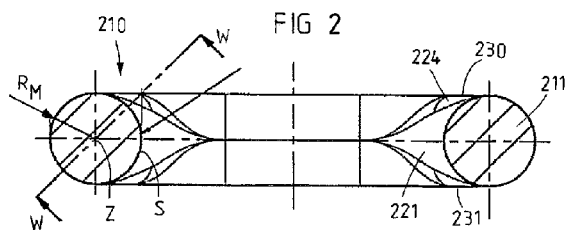
FIG. 5 shows a sectional view along V-V in FIG. 4.

FIG. 5 shows a vertical section through a horizontal chain link 210 in the region of (vertical) central longitudinal plane M. Front sections 211 have in central longitudinal plane M a circular cross-section with a radius $R_M$ which forms the minimum material thickness of the horizontal chain links and in the case of a 42 mm chain is approximately $R_M=21$ mm and in the case of a 34 mm chain is approximately $R_M=16.5$ mm. Entire face zone 218 of front sections 211, which runs straight, perpendicular to the chain running direction, at the front side, is preferably rounded with the same radius $R_M$ so that therefore a face zone 218 which is rounded uniformly between upper side 230 and lower side 231 extends across the entire front surface of horizontal chain links 210. Hollow 221 in the surface of the rear side of front sections 211 preferably has a constant radius of curvature $R_K$, as is schematically indicated in FIG. 8, wherein this radius of curvature $R_K$, depending on the manufacturing precision, corresponds either to the rounding diameter of circular side 205 of vertical chain links 201 or, particularly in the case of forged parts, is larger by a necessary oversize of approximately 2 to 4 mm, preferably 3 mm. Hollow 221 is produced by unwinding this radius of curvature $R_K$ around center point Z of front sections 211 in longitudinal central plane M, as a result of which the V-shaped taper of hollow 221 is inevitably produced towards upper side 230 and lower side 231 of horizontal chain links 210. Crown line S of hollow 221 coincides with the surface of front sections 211 in longitudinal central plane M and it extends on a semi-circle around center point Z of front sections 211 in central longitudinal plane M.

Reference is now made again to FIGS. 1 to 4 from which it is clearly apparent that longitudinal limbs 212 are provided on insides 223 with a crowned fillet, wherein the degree of rounding of this fillet of longitudinal sides 223 is preferably of equal size to radius $R_M$ or the rounding diameter at face zones 218 of front sections 211. This fillet of longitudinal sides 223 extends partially into the rear sides of front sections 211, as indicated with partial surface 222 of the surface of the rear sides at the transition to longitudinal sides 223 respectively in FIGS. 3 and 4. The rear side of front sections 211 therefore has a radius of curvature $R_K$ which is rounded with fillet radius $R_M$. In order to prevent a sharp-edged transition between this degree of fillet with diameter $R_M$ and hollow 221 with radius of curvature $R_K$, the transition surfaces are rounded with an intermediate rounding 224 which is preferably approximately 6°. FIGS. 3 and 5 clearly show that hollow 221 and intermediate rounding 224 each extend across the rear side of front sections 211 up to the insides of longitudinal limbs 212 and also taper in a pointed manner or in a V-shape there before the fillet only extends with degree of rounding $R_R$, as shown in FIG. 9, across the inside 223 of longitudinal limbs 212. Degree of fillet $R_R$ of longitudinal sides 223 is indicated on longitudinal limbs 212 in FIG. 9 and is preferably of equal size to degree of fillet $R_M$ on the front sections 211.

Hollow 221 provided centrally of the rear sides of front sections 211, with which hollow 221 the central region of the contact zone of horizontal chain links 210 with circular arcs 205 of vertical chain links 201 is formed, leads, in particular eccentrically to central longitudinal place M, to a significantly improved osculation of the contact surfaces of vertical chain links 201 and horizontal chain links 210 relative to one another, as a good osculation of the contact surfaces, i.e. of circular cross-section $R_M$ in the center or central longitudinal plane M of front sections 211 with the crown camber of circular arc 205, is achieved and a uniform and smooth resting against the contact surfaces is achieved at a lateral offset to the central longitudinal plane at the outer edge of the inner opening of vertical chain links 201, as well. As a result of these measures, the corresponding edge regions of front sections 211 have a greater material thickness on the rear side, as a result of which the service life of horizontal chain links 210 is also significantly improved.

In order to optimize the weight of the horizontal chain links, on the one hand, a relatively rapid transition of front sections 211 to the outer surfaces is provided via circular arc-shaped flanks 219 into the linearly running base section of recesses 214 which spring back relatively deeply, as a result of which a relatively large-format undercut behind lateral front ends 240 of front sections 218 is achieved, and, on the other hand, according to one aspect of the present invention, longitudinal limbs 212 are provided on outer surfaces 241, which face recess 214, with an in this case circular arc-shaped surface which is cambered in a crowned manner, which outer surfaces 241 extend with a constant circular arc between upper side 230 and the lower side of horizontal chain links 210 on both sides of entrainment noses 215 over the height of longitudinal limbs 212. The surface, which is cambered in this case in a circular arc-shaped, crowned manner, on outsides 241 is formed both in the region in which the recesses have linear base sections 220 as well as in those sections in which recesses 214 have arcuate flank 219 and horizontal chain link 210, as a result of the surface or fillet, which is cambered in a crowned manner, of outer surfaces 241 of longitudinal limbs 212 not only obtains a minimization of cross-section, but rather in particular also a minimization of substantially flat upper side 230 and lower side 231 (FIG. 5). As FIGS. 3 and 4 in particular clearly show, as a result of the fillet on inner surfaces 223 of longitudinal limbs 212 and the crowned fillet on outer surfaces 241 of longitudinal limbs 212, upper side 230 and correspondingly also lower side 231 are partially minimized to a narrow web which is only a few millimeters wide and in this case corner regions 245 expanding in a V-shape with a substantially flat covering surface are formed at the transition of the longitudinal limbs to the front sections. As a result of this, horizontal chain link 210 lies, in operational use, exclusively with the regions lying in a plane, in this case the narrow strip and corner regions 245, on the conveyor base, as a result of which, due to the reduction in the surface which is available for bearing, higher surface pressures are generated which make it easier for horizontal chain link 210 to displace coal or nutty slack. This improved displacement effect also has a positive effect on the feed-in performance of horizontal chain links 210 and thus of an entire link chain 250 into the chain wheel pockets of drive chain wheels with which a link chain according to the invention is driven e.g. in the case of an underground face or drift conveyor. In the region in which the fillet of inner surfaces 223 of the longitudinal limbs and the fillet or crowned camber of outer surfaces 241 of longitudinal limbs 212 lie opposite one another, the longitudinal limb has, as FIG. 6 shows, an approximately oval cross-section with circular fillets on inner surfaces 223 and outer surfaces 241 and a short linear intermediate section 246 on upper and lower sides 230, 231. In the region of entrainment nose 215 and in order to face zones 218 of front sections 211, longitudinal limbs 212 have a significantly different cross-section.

In order to further improve the entrainment effect for chain scrapers which can be connected to horizontal chain links 210, as explained in the exemplary embodiments, entrainment noses 215 can protrude with their abutting surfaces 215' over abutting surfaces 240' of front ends 240 of front sections 211 so that horizontal chain link 210 has in the region of entrainment noses 215 an outer width which is between approximately 2 mm and 10 mm, preferably approximately 5 mm to 7 mm larger than chain link width $B_H$ on end surfaces 240' of front sections 211. Front ends 240 have, as FIGS. 3 and 4 show, a circular cross-section, wherein the radius of the circular cross-section in the region of front ends 240 is preferably of equal size or substantially of equal size to radius $R_M$ of front sections 211 in central longitudinal plane M. Entrainment noses 215 have, across the height of horizontal chain links 210, an approximately rectangular cross-section with rounded corners, as FIG. 7 clearly shows. Upper and lower sides 230, 231 with a substantially flat course can also extend across the region of entrainment nose 215. The radius of curvature of flanks 219 can be approximately ⅔ $R_M$.

FIGS. 10 to 13 show a second exemplary embodiment of a horizontal chain link 310 according to the invention which in turn has in each case front sections 311 with a linear or straight face zone 318 across the width of chain links 310 and longitudinal limbs 312 which connect front sections 311 around an inner opening 313 and which are in each case provided on the outside with recesses 314 in which entrainment noses 315 are centrally formed in order to be able to connect a chain scraper (not shown) to each horizontal chain link or to individual horizontal chain links 310. For the purpose of linking optimization of the interaction of horizontal chain links 310 with vertical chain links, as they are shown for example in FIGS. 1 and 2, also in the case of horizontal chain link 310, the rear sides of front sections 311 are provided with a hollow 321 which extends evenly from semi-circular portion 317, which delimits inner opening 313 on both sides, to upper side 330 and lower side 331. Recesses 314 are, proceeding from front sections 311, delimited by arcuate flanks 319, which have a circular arc curvature with a radius of curvature $R_F$, which, in contrast to the previous exemplary embodiment, is significantly larger and in this case is approximately three times as large as the radius of curvature of front sections 311 in central longitudinal plane M. Arcuate flanks 319 extend almost across the entire length expansion of recess 314 with the exception of a very short linear arcuate section 320 directly adjoining entrainment nose 315 which projects to the outside. In this case, outer abutting surfaces 315' of entrainment noses 315 also protrude slightly beyond abutting surfaces 340' of front sections 311 so that chain link 310 has the largest width in the region of entrainment nose 315. Longitudinal limbs 312 are filleted in a circular arc shape on inner surfaces 323 which face inner opening 313. According to the first aspect according to the invention, outer surfaces 341 of longitudinal limbs 312 are formed both in the region of flank 319 as well as in the region of linear base section 320 so as to be cambered in a crowned manner, as the sectional view according to FIG. 13 in particular shows. In each case beginning on upper sides 330 and lower sides 331, outer surfaces 341 extend first with a crowned, partially also circular arc-shaped camber 341', which however becomes increasingly flat towards the horizontal central plane or towards the outside. As the top view in FIG. 10 of chain link 310 according to the invention clearly shows, the fillet or camber on inner surface 323 and on outer surface 341 forms a transition approximately directly into one another at least in the region of linear arcuate sections 320 so that longitudinal limbs 312 obtain a circular or oval cross-section there. Upper sides 330 and lower sides 331 either have no intermediate section or they are minimized there either to a narrow ridge or a narrow web and expand in corner regions 345 in a V-shape towards the outside up to the fillet on the front surface of front sections 311 or to the fillet of outer surfaces 341 of longitudinal limbs 312. All four or in general corner regions 345 in each case between front sections 311 and outer surfaces 341 and inner surfaces 323 of longitudinal limbs 312 are provided with cavities 360, by means of which the surface on upper sides 330 and lower sides 331 is in turn minimized. Cavities 360 both on upper sides 330 and on lower sides 331 preferably have a depth T, which in the exemplary embodiment shown amounts to a maximum of approximately ⅓ to ¼ of radius $R_M$ in central longitudinal plane M or of the radius of curvature on front surfaces 318. All cavities 360 are closed at the edge side and are formed substantially trilaterally here. The cavities could nevertheless also be formed ovally longitudinally extended or triangularly in so far as a corresponding geometry of cavities 360 can be arranged and accommodated in corner regions 345 which expand in a V-shape towards the outside. As a result of additional cavities 360, the bearing surface and also the overall weight of horizontal chain links 310 can be further reduced, as a result of which the displacement of coal is improved due to the higher surface pressures. Since in this case flanks 319 of recesses 314 feed relatively flat into front ends 340, front ends 340, as the side view in FIG. 11 clearly shows, have an approximately V-shaped contour with a pronounced central flank 347 in the region of the horizontal plane of division of horizontal chain links 310. This central flank 347, which can be formed to be even larger as a result of various rounding dimensions of the arcuate curvature of flanks 319, extends adjacent to the horizontal central plane up to entrainment nose 315.

Figure 14:
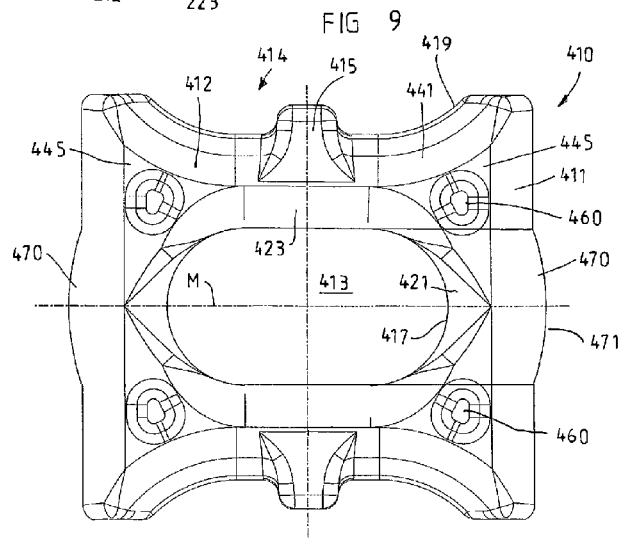
FIG. 14 shows a top view of a horizontal chain link according to a third exemplary embodiment.

FIG. 14 shows a third exemplary embodiment of a horizontal chain link 410 according to the invention. Longitudinal limbs 412, which in turn connect front sections 411 to one another around an inner opening 413, are provided as in the previous exemplary embodiment with only a partially crowned camber on outer surfaces 441 and preferably circular arc-shaped fillet on inner surfaces 423. Arcuate flanks 419 which delimit recesses 414 have an arcuate curvature of similar size to the previous exemplary embodiment. Entrainment noses 415 arranged centrally in recesses 414 have in this case a smaller width expansion on their abutting surfaces than front sections 411 and corner regions 445, as in the previous exemplary embodiment, are in turn provided with cavities 416. For the purpose of linking optimization, the rear sides of front sections 411 in each case have a hollow 421 which extends up to semi-circular rounded portion 417 from the upper and the lower side of horizontal chain link 410. In contrast to the previous exemplary embodiments, both front sections 411 are nevertheless provided centrally in each case with a front reinforcement 470 which runs in an arcuate manner on the front side so that front reinforcement 470 brings about the largest thickening of front sections 411 in longitudinal central plane M of horizontal chain links 410. Front reinforcement 470 is curved in an arcuate manner with a large radius of curvature and it extends in its width only across the entire width of inner opening 413.

Numerous modifications which should fall within the scope of protection of the attached claims are apparent to the person skilled in the art from the above description. The entrainment noses can, but do not need to, project laterally beyond the front ends, even if horizontal chain links with laterally projecting entrainment noses offer advantages for entrainment of the chain scrapers. The radii of curvature can differ from the exemplary embodiments shown. All the features can also be advantageously used in the case of chain links with different chain link geometries. In the case of chain links with a larger or smaller chain link strength and a correspondingly changed modular width, other diameters and radii of curvature can thus be produced in order to achieve the same optimization of the horizontal chain links and the interaction of horizontal and vertical chain links. Since not every horizontal chain link must be used to connect an entrainment scraper in a link chain, individual horizontal chain links can be provided with corresponding entrainment means and the other chain links do not have any corresponding entrainment nose. In the case of these horizontal change links which then only form connecting links, the recess could also have a different geometric dimension.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A chain link, preferably for connection of entrainment scrapers to link chains for scraper chain conveyors for use in mining, comprising:
   front sections with a generally straight face zone;
   longitudinal limbs, which connect the front sections around an oval inner opening and which are provided on their outer surfaces with a recess;
   wherein the rear sides of the front sections, delimiting the oval inner opening with a semi-circular portion connecting the longitudinal limbs, form a contact zone for circular arcs of associated chain links; and
   wherein the longitudinal limbs on the outer sides, which face the recess, comprises at least adjacent to the upper side and lower side of the chain link a spherical shaped surface.

2. The chain link according to claim 1, wherein the chain link further comprises on the transition to the front sections into the longitudinal limbs corner areas, wherein the longitudinal limbs on their top side and bottom side at least in the corner areas are partially provided with a cavity.

3. The chain link according to claim 1 wherein the rear sides of the front sections, which face the oval inner opening of the chain link, are provided with a surface which has a hollow, which forms a central region of the contact zone, within a crowned fillet.

4. The chain link according to claim 3, wherein the hollow extends with a constant radius of curvature over the entire surface of the rear sides of the front sections.

5. The chain link according to claim 4, wherein the radius of curvature of the hollow has a crown line which lies on a central longitudinal plane between the longitudinal limbs of the chain link.

6. The chain link according to claim 5, wherein the front sections have in the central longitudinal plane a circular cross-section with a radius which is preferably of equal size or substantially of equal size to the radius of curvature of the crowned fillet.

7. The chain link according to claim 5, wherein the crown line of the hollow forms a semicircle around a center point of the front sections in the central longitudinal plane.

8. The chain link according to claim 7, wherein the hollow on the rear side of the front sections comprises a rotationally symmetrical unwinding of the radius of curvature around the center point of the front sections.

9. The chain link according to claim 5, wherein the crowned fillet forms a transition via an intermediate circular portion into the hollow, wherein the radius of curvature of the intermediate circular portion is preferably less than half as large as the radius of curvature of the crowned fillet.

10. The chain link according to claim 5, wherein the hollow has a constant radius of curvature and the circular arc of the vertical chain links also has a constant radius which is preferably approximately 1 to 4 mm smaller than the radius of curvature of the hollow.

11. The chain link according to claim 5, wherein the hollow extends across the entire semi-circular portion into the longitudinal limbs.

12. The chain link according to claim 6, wherein the front sections have corner regions on at least one of the outsides at the transition to the longitudinal limbs and the end in front ends with a circular cross-section, wherein the radius of the circular cross-section is preferably of equal size or substantially equal size to the radius in the central longitudinal plane.

13. The chain link according to claim 1, wherein the longitudinal limbs on the insides facing the inner opening are provided with a fillet which is cambered in a crowned manner, whose radius of curvature is preferably of equal size to the radius of curvature on the rear sides of the front sections.

14. The chain link according to claim 1, wherein the chain link is provided on both sides in the recesses with an entrainment nose formed centrally between both front sections, wherein the entrainment nose protrudes in a projecting manner into the relevant recess.

15. The chain link according to claim 14, wherein each entrainment nose is formed on an outer face of the longitudinal limb with a trapezoidal cross-section.

16. The chain link according to claim 14, wherein the outer surfaces, which face the recesses, of the longitudinal limbs between the front sections and the entrainment nose are provided with flanks which run in an at least partially arcuately cambered manner.

17. The chain link according to claim 16, wherein a base section which runs in a straight line is formed between the arcuate flanks, from which base section the entrainment nose projects.

18. The chain link according to claim 17, wherein the arcuate flank has a circular arc curvature, wherein the circular radius is smaller than the radius in the central longitudinal plane.

19. The chain link according to claim 17, wherein the arcuate flank has a circular arc curvature, wherein the circular radius is larger than the radius in the central longitudinal plane.

20. The chain link according to claim 17, wherein the surface, which is cambered in a crowned manner, extends from the upper and lower side over the arcuate flank and the linear base section.

21. The chain link according to claim 20, wherein the crowned camber of the surface of the longitudinal limbs on the outside is at least partially of equal size or approximately equal size to a fillet, which is cambered in a crowned manner, of the surface of the longitudinal limbs on the insides which face the inner opening.

22. The chain link according to claim 16, wherein a flat intermediate section which forms the bearing surface for the chain link is formed between the cambered insides and the cambered outer surfaces of the longitudinal limbs, which intermediate section preferably widens from a narrow web towards the surfaces of the front sections in an approximately V-shaped manner.

23. The chain link according to claim 14, wherein abutting surfaces of the entrainment nose protrude across abutting surfaces of the front sections and the chain link in the region of the entrainment nose have the largest chain link width.

24. The chain link according to claim 1, wherein an individual cavity which is closed at the edge and at the base is formed in each corner region on a lower side and on an upper side of the chain link.

25. The chain link according to claim 1, wherein the front sections on the front sides are provided centrally with a front reinforcement which projects towards the front, wherein the front reinforcement preferably has a curved surface and the maximum width of the front reinforcement is of equal size to or smaller than the width of the inner opening.

26. A link chain for chain conveyors, in particular scraper chain conveyors for use in mining, comprising:
- vertical chain links which have around their full circumference a generally constant cross-sectional profile provided on the inside with a circular arc and on the outside with a flat section
- horizontal chain links which have front sections with a generally straight face zone;
- longitudinal limbs, which connect the front sections around an oval inner opening and which are provided on their outer surfaces with a recess;
- wherein rear sides of the front sections, delimiting the inner opening with a semi-circular portion connecting the longitudinal limbs, form a contact zone for the circular arcs of the vertical chain links and
- wherein the horizontal links on the longitudinal limbs on the outer sides, which face the recess, comprises at least adjacent to the upper side and lower side of the horizontal chain links a spherical shaped surface.

27. The link chain according to claim 26, wherein the vertical chain links are provided at the transition of the flat section to the circular arc with a bevel, wherein the cross-sectional profile of the vertical chain links has a width to thickness ratio $L_V/D_V \geq 2$.

28. The link chain according to claim 26, wherein at least one or all of the horizontal chain links is provided on both sides in the recesses with an entrainment nose formed centrally between both front sections, wherein each entrainment nose protrudes in a projecting manner into the relevant recess.

29. The link chain according to claim 26, wherein the horizontal link further comprises on the transition to the front sections into the longitudinal limbs corner areas, wherein the longitudinal limbs on their top side and bottom side at least in the corner areas are partially provided with a cavity.

* * * * *